United States Patent [19]

Johnson

[11] Patent Number: 5,439,025

[45] Date of Patent: Aug. 8, 1995

[54] FLOAT OPERATED FILL VALVE

[76] Inventor: Dwight N. Johnson, 6327 Chorlito Dr., Carlsbad, Calif. 92008

[21] Appl. No.: 365,346

[22] Filed: Dec. 28, 1994

Related U.S. Application Data

[63] Continuation of Ser. No. 246,120, May 19, 1994, which is a continuation of Ser. No. 88,817, Jul. 8, 1993, Pat. No. 5,337,781, which is a continuation of Ser. No. 909,386, Jul. 8, 1992, Pat. No. 5,255,703.

[51] Int. Cl.⁶ ............................................. F16K 31/18
[52] U.S. Cl. .................................................... 137/426
[58] Field of Search ............................. 137/414, 426

[56] References Cited

U.S. PATENT DOCUMENTS

| | | | |
|---|---|---|---|
| 3,797,518 | 3/1974 | Holm et al. | 137/434 |
| 4,080,986 | 3/1978 | Schoepe | 137/426 |
| 4,094,327 | 6/1978 | Brandelli | 137/426 |
| 4,182,364 | 1/1980 | Gilbert et al. | 137/426 |
| 4,286,619 | 9/1981 | Straus | 137/426 |
| 4,600,031 | 7/1986 | Nestich | 137/426 |
| 4,646,779 | 3/1987 | Johnson | 137/426 |
| 4,765,363 | 8/1988 | Pi-Yu | 137/414 |
| 4,945,944 | 8/1990 | Chen | 137/426 |
| 5,035,527 | 7/1991 | Antunez | 137/414 |
| 5,211,204 | 5/1993 | Mikol | 137/426 |

Primary Examiner—George L. Walton
Attorney, Agent, or Firm—Mason, Kolehmainen, Rathburn & Wyss

[57] ABSTRACT

A fill valve assembly for a toilet tank or the like includes a riser and a head portion that can be vertically adjusted without removal or disassembly of the valve in order to select a precise tank liquid level. Telescoping conduits in the riser are secured in adjusted position by a bayonet latch system including detents assisted by the force applied by pressurized liquid at the inlet to the assembly. A main valve disk is held against a valve seat by pressure in a control chamber in a standby position and is moved to an open position by venting of the control chamber. The valve includes an axial peripheral flange having an enlarged bead portion captured in an annular channel to provide an O-ring type seal against positive and negative pressure while maximizing flexibility of the disk. A lever for controlling a pilot seat for venting the chamber is pivoted between fulcrum flanges and is held by shoulders abutting one of the flanges. The lever is pivoted by a float in a float chamber. A weir and a float controlled valve prevent entry of water into the float chamber in a refill cycle until tank liquid level reaches the selected level to be maintained.

2 Claims, 6 Drawing Sheets

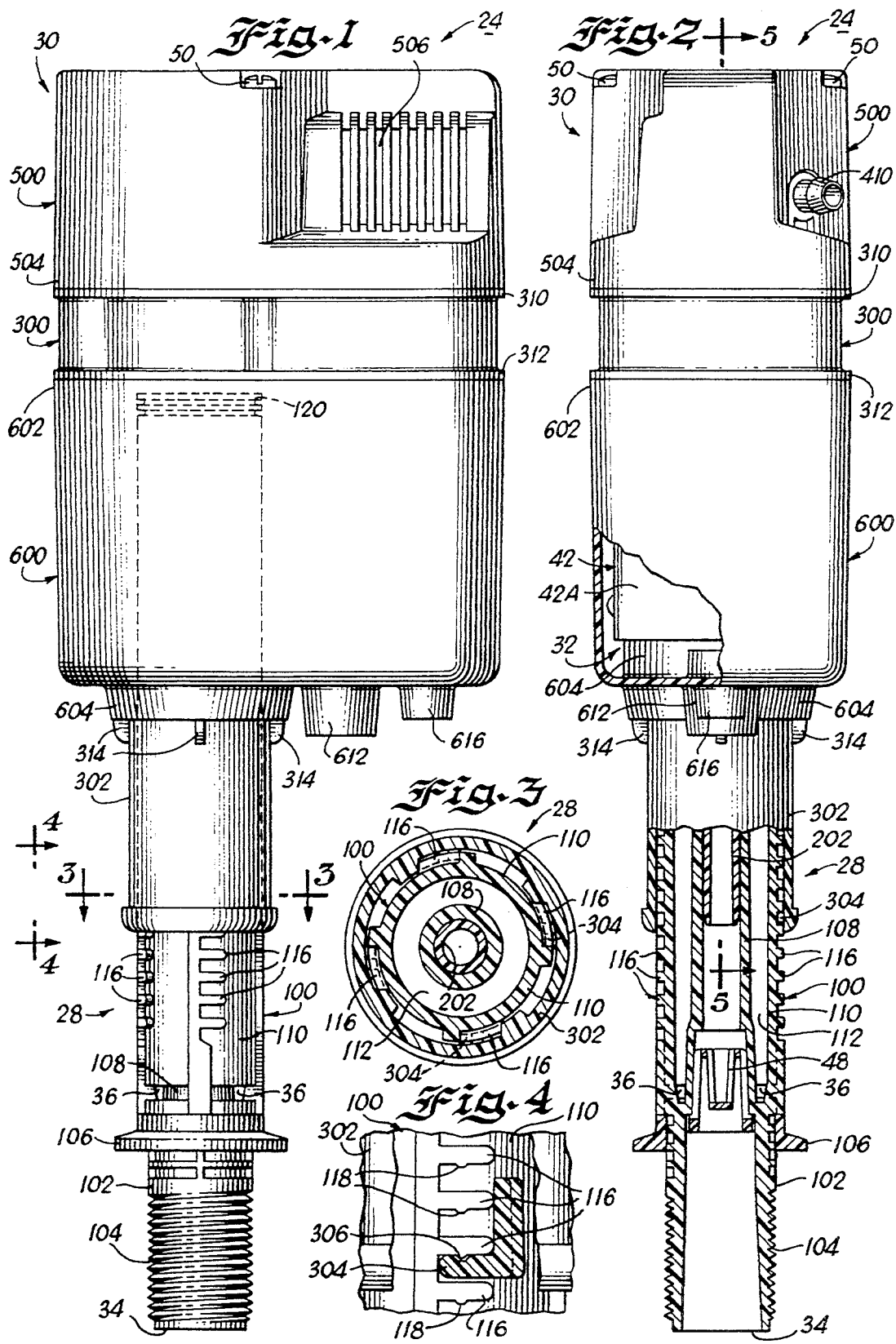

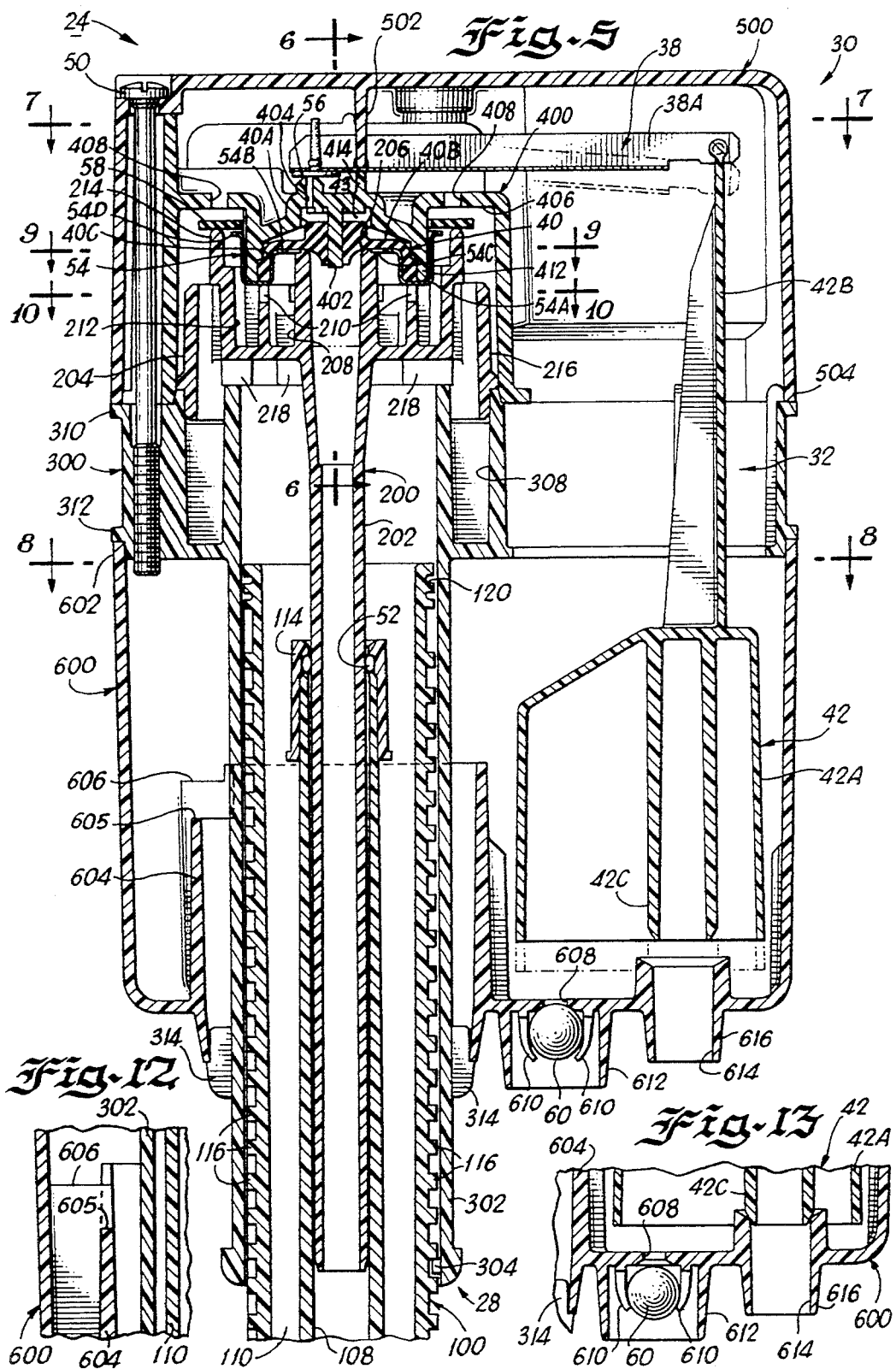

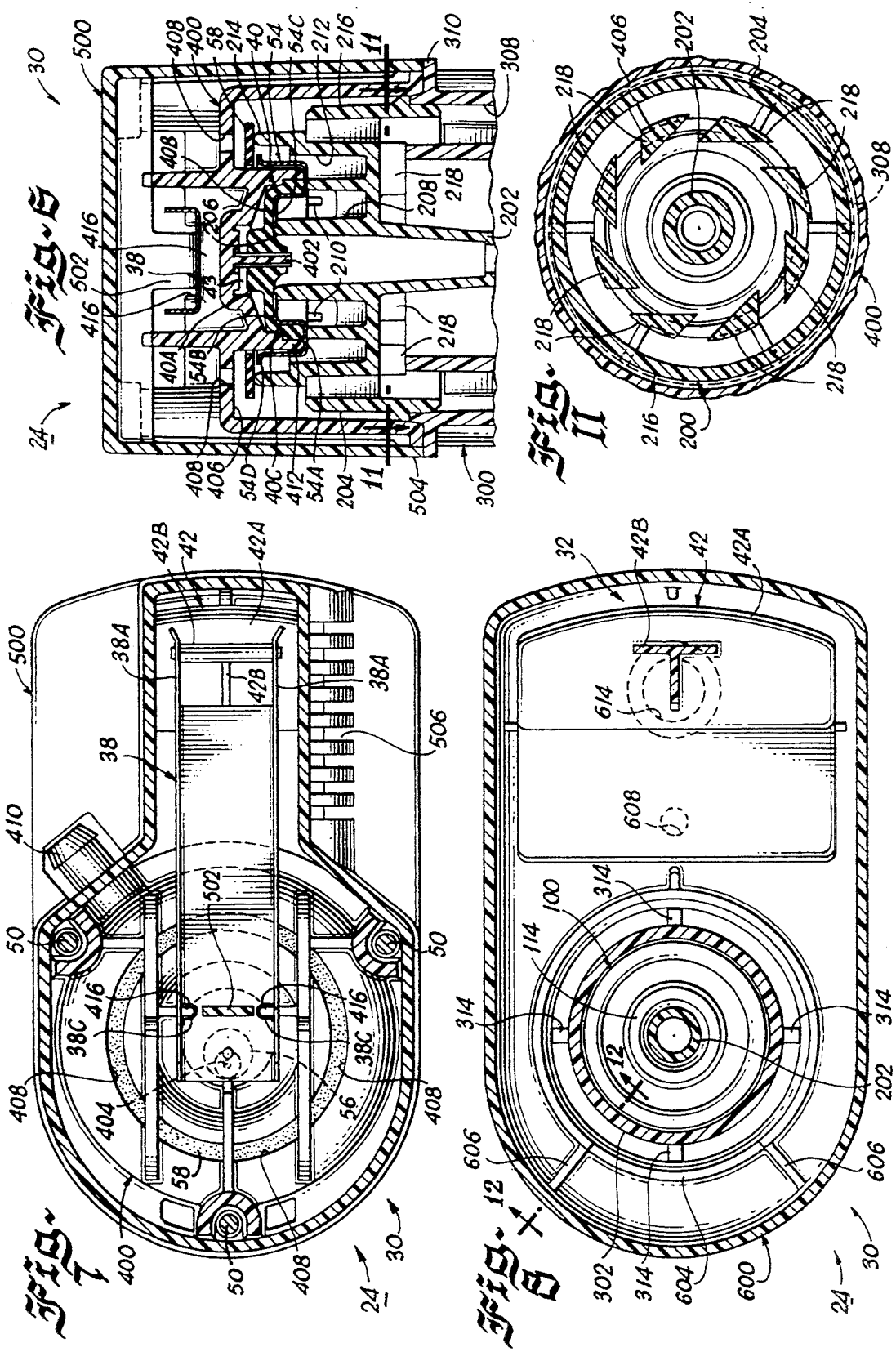

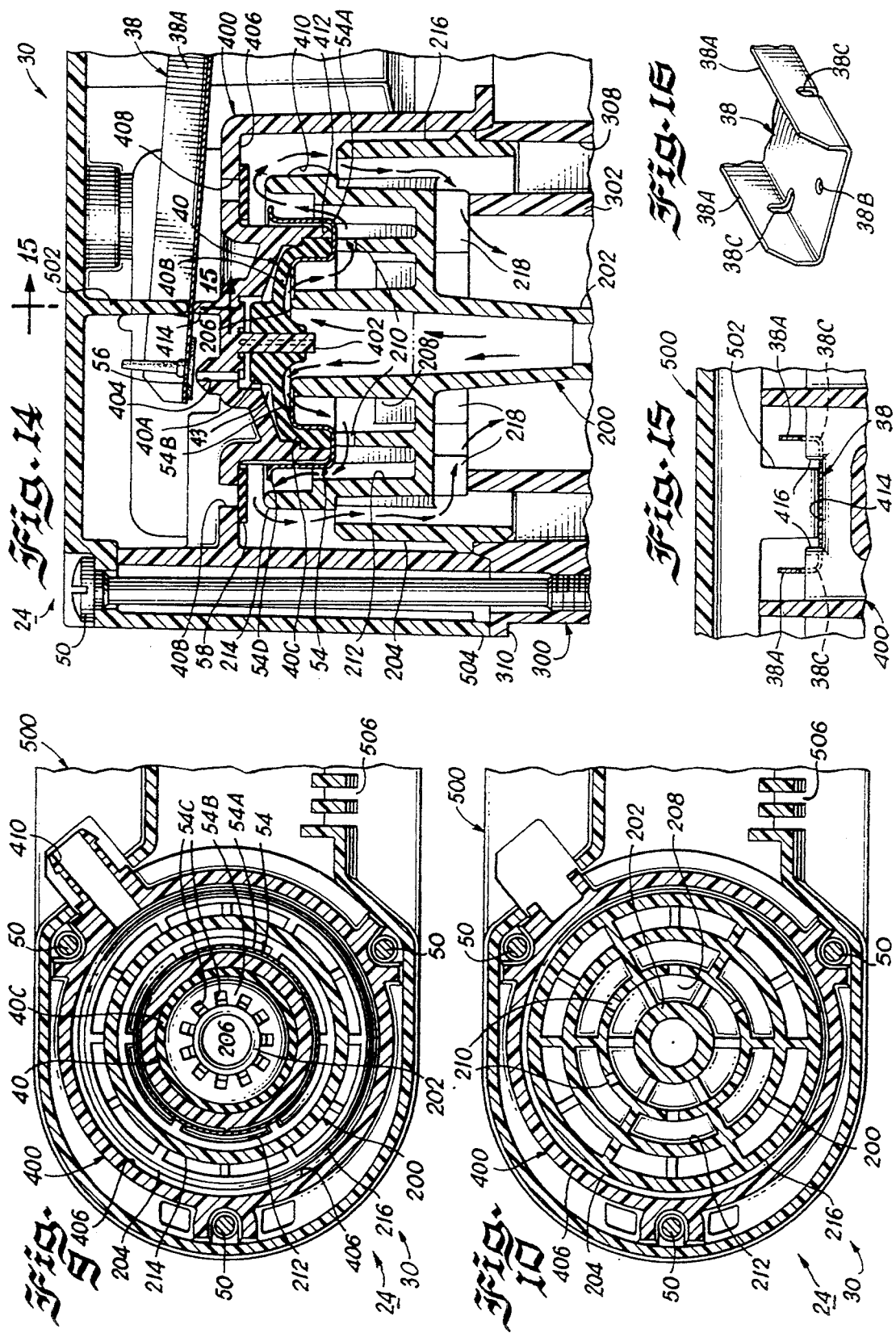

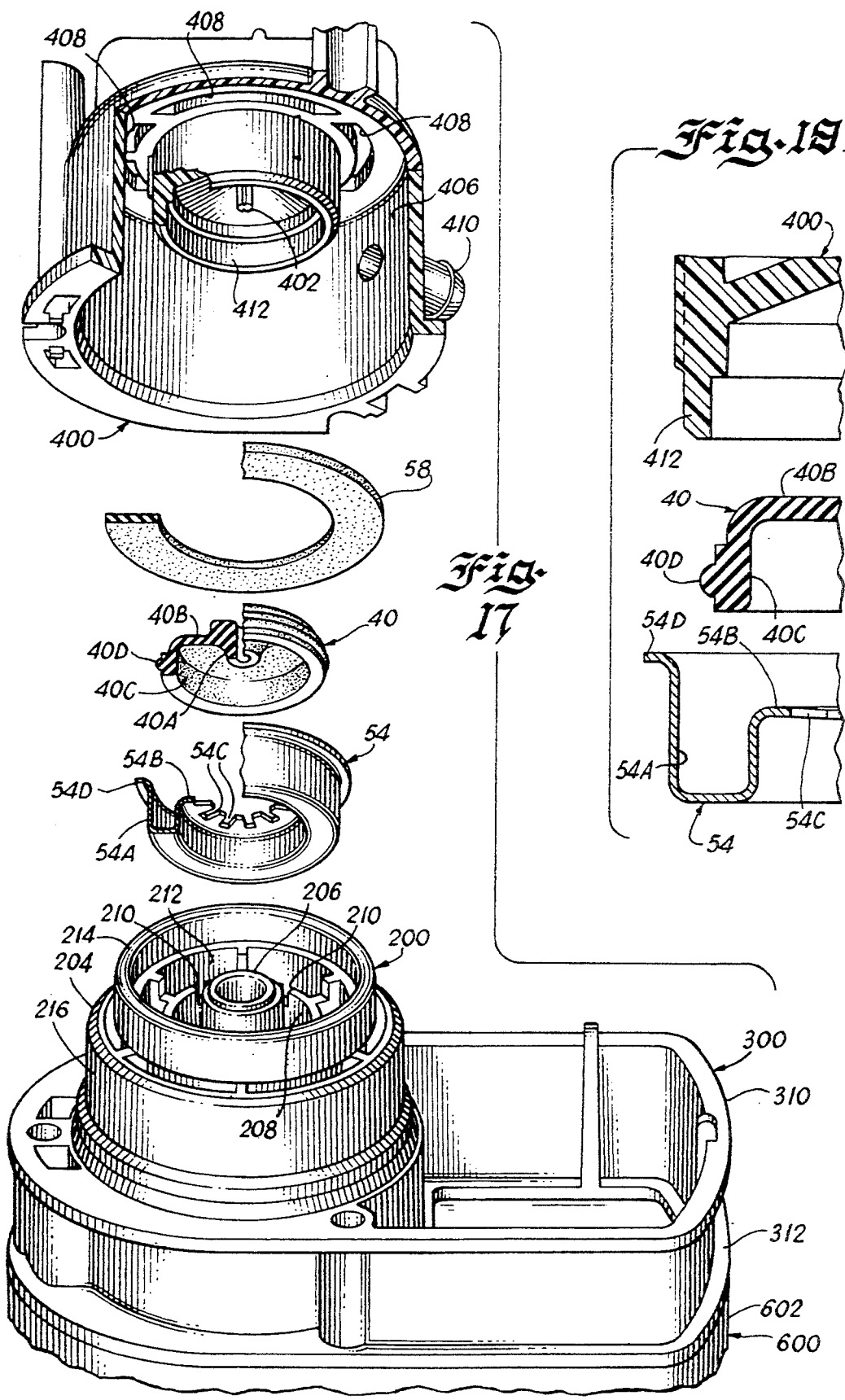

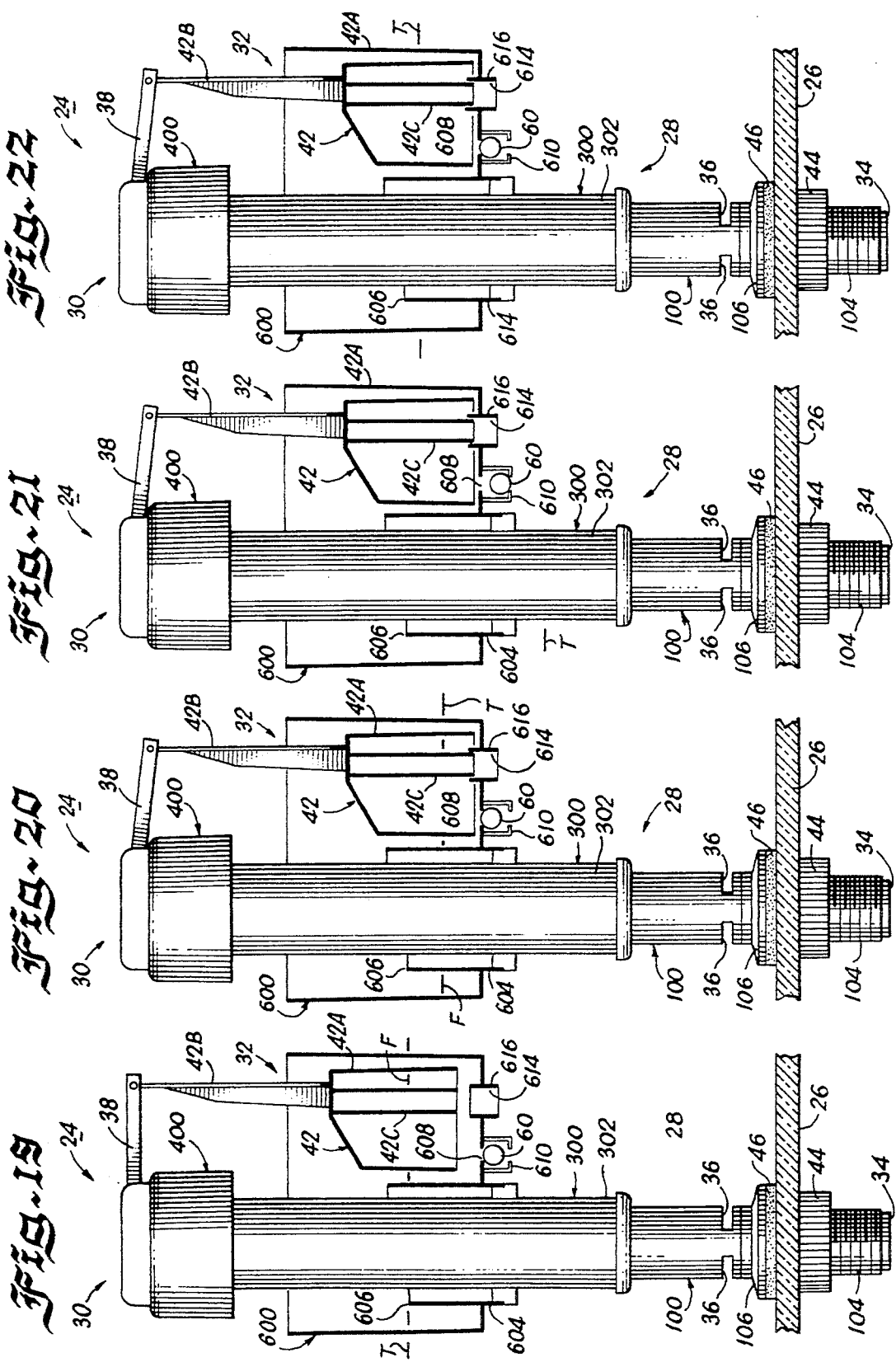

FLOAT OPERATED FILL VALVE

This is a continuing application of application Ser. No. 08/246,120, filed May 19, 1994, which prior application is a continuing application of Ser. No. 08/088,817, filed Jul. 8, 1993, now U.S. Pat. No. 5,337,781 which prior application is a continuing application of Ser. No. 07/909,386, filed Jul. 8, 1992, now U.S. Pat. No. 5,255,703.

FIELD OF THE INVENTION

This invention relates to valves for controlling the filling of liquid tanks, and more particularly to an improved fill valve responsive to the position of a float.

DESCRIPTION OF THE PRIOR ART

Many different types of fill valves for controlling the level of liquid in a tank are known. In general such fill valves include position for sensing liquid level in a tank. A float is often employed. A valve operated in response to the float position permits flow from a liquid supply to the interior of the tank when the level drops below a predetermined level maintained by the valve. Fill valves of this type are used in toilet water tanks to maintain the water at a selected level and to refill the tank following a flush cycle during which the tank is emptied.

Snyder U.S. Pat. No. 1,037,679 discloses a flushing apparatus with a valve 3 controlled by a main float 23 and an auxiliary float 13. The auxiliary float 13 is a receptacle mounted for limited vertical movement and has an opening normally closed by a flap or check valve 17. When the tank is emptied, the auxiliary receptacle moves down, the flap valve 17 opens to permit water to drain from the auxiliary float 13 and the main float 23 moves down to open the valve 3. As the tank fills, the auxiliary float 13 is lifted, water flows over the upper edges of the auxiliary float 13 and the main float 23 is lifted to close the valve 3.

Brandelli U.S. Pat. No. 4,094,327 discloses a telescoping liquid inlet conduit assembly that is adjustable to vary the liquid level in a tank. One conduit 32 has peripheral grooves 29. The other conduit 34 has one or more protrusions 27 that cooperate with grooves 29. Conduit 34 has axial slots permitting the conduit wall to flex. A snap fit end cap secures the conduits in a selected position.

Johnson U.S. Pat. No. 4,646,779 discloses an adjustable fill valve with a riser assembly with side by side inlet and outlet portions. A rotatable nut 44 accessible through opening 218 engages rack gear teeth 110 on inlet and outlet sections of a valve body 100. When the nut is rotated, the body is raised or lowered.

Johnson U.S. Pat. No. 3,895,645 and Shames et al. U.S. Pat. No. 4,562,859 disclose fill valves with valve disks with peripheral upwardly facing lip seals surrounding control chambers above the valve disks.

SUMMARY OF THE INVENTION

A primary object of this invention is to provide a fill valve that maintains a precise, repeatable and predictable water level in a tank such as a toilet tank. Other objects are to provide a fill valve permitting easy and precise water level adjustment without removing or disassembling the valve; to provide a fill valve with a valve disk sealing arrangement that maximizes disk flexibility while sealing against both positive and negative pressures in a control region above the disk; to provide a fill valve having a simplified and easily assembled control lever mounting arrangement; to provide a fill valve with a vacuum breaker for preventing back siphonage for a tank into a water supply; to provide a fill valve that is highly sensitive to water level changes in a standby condition yet operates abruptly from full open to full closed at the conclusion of a refill operation; and to provide a fill valve that overcomes problems encountered with known fill valves.

In brief, in accordance with the present invention there is provided a fill valve assembly for maintaining a liquid level in a tank including a liquid inlet conduit and a valve having an inlet communicating with the inlet conduit and an outlet communicating with the tank. A float chamber within the tank includes a bottom wall. A dam is spaced above the bottom wall permitting liquid communication between the tank and the float chamber when liquid level in the tank rises to the elevation of the dam. A float is mounted for floating movement between upper and lower positions within the float chamber. A lever connected between the float and the valve opens the valve in response to downward movement of the float and closes the valve in response to upward movement of the float. Means is provided for draining the float chamber when the liquid level in the tank is below the bottom wall. Means is also provided for providing a flow path in parallel flow relationship with the dam for permitting liquid communication between the tank and the float chamber when the float is in the upper position.

BRIEF DESCRIPTION OF THE DRAWINGS

The invention and the above and other objects and advantages may best be understood from the following detailed description of the embodiment of the invention shown in the accompanying drawings, wherein:

FIG. 1 is a side elevational view of a fill valve constructed in accordance with the present invention;

FIG. 2 is a front elevational view of the fill valve, taken from the right side of the valve as viewed in FIG. 1, with a portion of the float chamber broken away;

FIG. 3 is an enlarged sectional view taken along the line 3—3 of FIG. 1;

FIG. 4 is an enlarged fragmentary elevational view taken from the line 4—4 of FIG. 1 with a portion broken away;

FIG. 5 is an enlarged fragmentary sectional view taken along the line 5—5 of FIG. 2;

FIG. 6 is a fragmentary sectional view taken along the line 6—6 of FIG. 5;

FIG. 7 is a sectional view taken along the line 7—7 of FIG. 5;

FIG. 8 is a sectional view taken along the line 8—8 of FIG. 5;

FIG. 9 is a fragmentary sectional view taken along the line 9—9 of FIG. 5;

FIG. 10 is a fragmentary sectional view taken along the line 10—10 of FIG. 5;

FIG. 11 is a fragmentary sectional view taken along the line 11—11 of FIG. 6;

FIG. 12 is an enlarged fragmentary sectional view taken along the line 12—12 of FIG. 8;

FIG. 13 is a view similar to a part of FIG. 5 showing portions of a float controlled valve and a check valve in alternate positions;

FIG. 14 is an enlarged view similar to a part of FIG. 5 showing the fill valve in an open position and showing the path of liquid flow through the fill valve;

FIG. 15 is a fragmentary sectional view taken along the line 15—15 of FIG. 14;

FIG. 16 is a fragmentary isometric view of the inner end of the control lever of the fill valve;

FIG. 17 is an exploded isometric view of components of the fill valve with portions broken away;

FIG. 18 is a greatly enlarged fragmentary sectional view of parts of the valve cup, valve disk and cap of the fill valve;

FIG. 19 is a partly schematic, simplified side elevational view of the fill valve of FIG. 1 installed in a tank and in a standby condition;

FIG. 20 is a view like FIG. 19 showing the fill valve near the beginning of a tank flush cycle;

FIG. 21 is a view like FIG. 20 showing the fill valve at a subsequent time following the flush cycle when the tank is being refilled; and FIG. 22 is a view like FIG. 21 showing the fill valve near the end of the tank refill operation.

DETAILED DESCRIPTION OF THE INVENTION

Referring now to the drawings, there is illustrated a fill valve assembly generally designated by the reference character 24 and embodying the features of the present invention. The assembly 24 serves to control the level of liquid in a tank. A fragment of a bottom wall 26 of a tank with which the assembly 24 can be used is seen in FIGS. 19-22. For example, the tank may be the flush tank of a toilet. In this case, the assembly 24 maintains the level of water in the tank at a preselected level, and refills the tank to the preselected level after the tank is emptied for a flushing operation.

In general, the assembly 24 includes an adjustable riser assembly 28, a valve head portion 30 and a float assembly 32. A liquid inlet port 34 located at the bottom of the riser assembly 28 is adapted to be connected to a source of pressurized liquid such as a household water supply. Liquid outlet ports 36 disposed within the tank near the bottom of the riser portion 28 admit liquid to the interior of the tank when liquid flows through the head portion 30. When a decreasing liquid level is detected by a float 42, a control lever 38 pivots to bring about the movement of a main valve disk 40 from a closed position to an open position.

Riser assembly 28 includes a vertically extending support 100 and a supply tube 200 and body 300 movable relative to the support 100 for vertical adjustment of the head portion 30 and thereby of the level of liquid maintained in the tank. A cap 400 overlies the supply tube 200 and body 300 and cooperates with the valve disk 40 to define a valve control chamber 43 within the head portion 30. A cover 500 and a float chamber 600 enclose these components and also enclose the float 42 and the lever 38 of the float assembly 32. The elements of each structural component designated by a three digit reference character share the first digit in the subsequent detailed description.

Support 100 includes an inlet segment 102 terminating at inlet port 34 and having threads 104 for mating with a threaded retention nut 44 (FIGS. 17-21). To mount the assembly 24 in position upstanding from the tank bottom wall 26, a sealing gasket 46 is placed against an attached flange member 106 and the segment 102 is inserted through a hole in wall 26. Nut 44 is tightened in place to hold the support 100 with the inlet segment 102 projecting beyond the wall of the tank. A conventional fitting secured to threads 104 connects a water supply conduit (not shown) to the end of segment 102 to admit water under pressure to the inlet port 34.

Water entering the inlet port 34 flows through a strainer element 48 in order to remove particles and debris. Above the region of the filter element 48, the support 100 includes an inlet conduit portion 108 surrounded by a concentric outlet conduit portion 110. Portion 108 supplies water from the inlet segment 102 to the supply tube 200. Portion 110 directs water supplied from the head portion 30 to slots 112 located around the support 100 above the flange member 106 and terminating at outlet ports 36.

Screws 50 extending through the cover 500 and threaded into the body 300 hold the cap 400 and supply tube 200 in the assembled position best seen in FIG. 5. The supply tube 200 has a downwardly extending inlet conduit 202. The body 300 has a downwardly extending outlet conduit 302 surrounding and concentric with the inlet conduit 202. In order to permit vertical adjustment of the head portion 30 to select a desired tank water level, the conduits 202 and 302 are telescoped with and slidable relative to conduits 108 and 110 respectively. Thus, inlet conduit portion 108 and inlet conduit 202 cooperate to provide an inlet flow path of variable length. Similarly, the outlet conduit portion 110 and the outlet conduit 302 cooperate to provide an outlet flow path of simultaneously variable length. A sleeve 114 holds an O-ring seal 52 to provide sliding leak tight engagement between conduit portion 108 and inlet conduit 202. A labyrinth seal structure 120 minimizes flow down around the outside of the outlet conduit portion 110.

A desired water level in the tank can be precisely selected by moving the head portion 30 up or down within the tank. The selected adjustment is retained by a bayonet locking system that prevents unintentional movement of head portion 30 relative to the support 100 and tank bottom wall 26. As seen in FIGS. 3 and 4, four regularly spaced, upwardly facing lock flanges 304 are formed on the interior of the outlet conduit 302 near its end. Rows of downwardly facing lock teeth 116 are located at four locations around the outer surface of the support 100. Because the supply and outlet conduits are concentric, the head portion 30 can be rotated relative to the support 100. When the head portion is turned counterclockwise relative to the support 100, the flanges 304 are disengaged from the teeth 116 and the head portion may be freely raised and lowered. When the head portion is turned in the opposite direction, each flange 304 enters a space between adjacent teeth 116 and further vertical movement is prevented.

When a supply of pressurized water is connected to the inlet port 34, there is a pressure drop across the head portion 30. A typical household supply pressure in the range of forty-five to sixty pounds per square inch results in a force in the neighborhood of four pounds continuously urging the head portion in an upward direction. This force is used in the assembly 24 to provide a latching effect in the bayonet lock system. As seen in FIG. 4, the teeth 116 have axially extending detent projections 118 and the flanges 304 have cooperating detent recesses 306. In the locked position the supply pressure continuously forces the projections 118 into the recesses 306. This force must be overcome by the user to release the projections 118 from the recesses 306 before the head assembly can be rotated to move the flanges 302 from engagement with the teeth 116.

An enlarged upper section 204 of the supply tube 200 is captured between the cap 400 and the body 300. The upper end of the inlet conduit 202 terminates in an annular raised valve seat 206 engaged by the main valve disk 40 in its closed position seen in FIG. 6. A valve cup 54 includes an annular channel 54A in which the radially outer part of the main valve disk 40 is retained. Cup 54 also provides an annular valving surface 54B surrounding the valve seat 206. As seen in FIGS. 9 and 17, the surface 54B has radially extending flow ports 54C defined by slots extending from the inner periphery of the cup 54. Preferably the seat 206 projects slightly above the surface 54B to provide final shutoff of flow in the valve closed position. The cup 54 may be made of stamped sheet metal or molded plastic, and the flow ports may be of any desired size and shape.

The cap 400 (FIG. 5) includes a restrictor pin 402 projecting through a hole in a central hub 40A of the valve disk 40. As seen in FIG. 6, grooves in the pin 402 permit restricted flow from the inlet conduit 202 to the control chamber 43 above the valve disk 40. In the standby condition, pressurized water trapped in the region 43 biases the valve disk 40 down into its closed position against the valving surface 54B and seat 206. A pilot valve passage or orifice 404 extends from the control chamber 43 to the exterior of the cap 400. When the level in the tank drops below the selected level, lever 38 moves a resilient pilot valve seat 56 from the closed position (FIG. 5) to the open position (FIG. 14). Pressure within the control chamber drops and inlet pressure moves the valve disk to its open position. Water then flows from the inlet conduit, radially out across the valve seat 206 and downward through the flow ports 54C in the valving surface 54B.

Water flowing through the valve assembly 24 drops in pressure from supply pressure to atmospheric pressure within the tank. The path of flow of water through the assembly 24, indicated by arrows in FIG. 14, is designed to distribute this drop in pressure in order to achieve quiet operation and avoid cavitation. The first substantial drop in pressure occurs when water flows through the flow ports 54C into an annular inner chamber 208 in the inlet tube portion 204. The next pressure reduction occurs when water flows through ports 210 from the chamber 208 to an outer annular chamber 212. Preferably most of the pressure reduction occurs in these two stages. Because each of these pressure drops results from flow through relatively small ports into relatively large areas, the frequency of sound resulting from water flow is relatively high and the coupling of sonic energy back into the water supply system is reduced.

A peripheral lip 54D of the valve cup 54 cooperates with an upstanding annular flange 214 of the supply tube 200 to form an annular port through which water flows from the chamber 212 to a vacuum breaker chamber 406 defined within the cap 400. A vacuum breaker valve disk 58 is loosely contained in the chamber 406. Vent ports 408 extend from the chamber 406 to the region within the cover 500. Kinetic energy of water flowing up past the lip 54D moves the disk 58 up to close the vent ports 408. When water flow ceases, the disk drops from the vent ports in order to vent the flow path to atmosphere and prevent back siphonage of water from the tank through the fill valve assembly 24 to the water supply system.

A refill port 410 extends from the vacuum breaker chamber 408. A flexible tube (not shown) may extend from the port 410 to the toilet tank overflow pipe to reseal the trap in the fixture in accordance with known practice. Preferably about twenty percent of the total flow through the valve is diverted through the port 410 for refill of the trap.

Water flows from the vacuum breaker chamber 406 through an annular passage defined within an outer peripheral wall 216 of the supply tube 200. This annular passage leads to an annular cavity 308 defined in the upper portion of the body 300. From this cavity, water flows radially inward through an array of vanes 218 (FIG. 11) which impart a swirling motion to the flow of water as it enters the outlet conduit 302. The spinning motion in the outlet conduit stabilizes the flow and promotes complete purging of air from the flow path when the valve opens. Early purging of air has the advantage that the noise of bubbles is masked by the normal sounds of the flush cycle.

Valve disk 40 includes a flexible annular valving region 40B extending radially away from the central hub 40A. At the outer periphery of the disk 40 there is provided an axially extending rim portion 40C terminating at an enlarged bead portion 40D. The rim and bead 40C and 40D are received in the annular channel 54A of the valve cup 54. When the cap 400 is attached with screws 50, acting on the cover 500, a downwardly extending annular flange 412 is also received in the channel 54A. The bead 40D is captured between the cup 54 and the flange 412 and functions as a partial O-ring seal.

When the pilot orifice 404 is closed by the pilot seat 56, the control chamber above the valve disk 40 is pressurized at the water supply pressure and the surrounding vacuum breaker chamber 406 is at lower atmospheric pressure. Bead 40D seals this pressure within the control chamber. When the pilot orifice is opened and the valve disk 40 opens, the pressure in the control chamber drops to atmospheric pressure. There is a higher pressure in the vacuum breaker chamber 406 employed to supply the refill port 410. For example, the pressure reversal may in the area of ten pounds per square inch. The bead 40D, because it functions as an O-ring seal, is able to seal both positive and negative or this reverse pressure.

Because the enlarged bead 40D is provided on axial rim 40C rather than at the outer periphery of the valving region 40B, the sealing arrangement does not interfere with flexing of the region 40B. The valving region 40B can flex throughout its full radial extent. As a result, the valve disk 40 can be urged to its fully open position by a relatively small inlet pressure of only a few pounds per square inch.

Lever 38 is pivotally mounted between the cap 400 and the cover 500 without the need for a pivot shaft or pin. As seen in FIGS. 15 and 16, the lever is generally U-shaped in cross section. At an outer end the bight of the U is removed to leave the sides as spring arms 38A for attachment to the float 42. At an inner end, the lever includes a hole 38B for mounting of the pilot seat 56. At the location of the pivot axis, a pair of aligned slots 38C are formed at the intersection of the bight and the side walls of the U shape.

The cap 400 includes an upwardly extending fulcrum flange 414. A downwardly extending fulcrum flange 502 of the cover 500 is aligned with the flange 414. As seen in FIGS. 14 and 15, the bight of the U is retained between the flanges 414 and 502. There is sufficient clearance to permit the lever 38 to pivot between its alternate positions seen in FIGS. 5 and 14 around the pivot axis established by fulcrum flanges 414 and 502. A pair of shoulders 416 flanking the flange 414 are received in the slots 38C. Engagement between the shoulders 416 and the slots 38C retains the lever 38 in position by preventing longitudinal movement of the lever and by preventing shifting or pivoting in the plane of the bight of the U shape.

An outer rim 504 of the cover 500 mates with an upper rim 310 of body 300. A lower rim 312 of body 300 mates with an outer rim 602 of the float chamber 600. The bottom of the float chamber includes a sleeve 604 captured against support projections 314 near the top of the outlet conduit 302 of the body 300. A vent grid 506 permits free communication of atmospheric pressure to the interior region surrounded by the chamber 600, the body 300 and the cover 500. These elements form a protected location for the float assembly 32 and also suppress noise resulting from the flow of water through the assembly 24.

There are three paths for liquid communication between the interior of the float chamber 600 and the surrounding tank. One is by way of the sleeve 604. The upper edge of the sleeve 604 has a reduced height segment 605 extending between providing a pair of ribs having upper edges 606 located below the upper edge of the rest of the sleeve 604. Edges 606 thus act as weirs or dams. When water in the tank reaches the level of weirs 606, it spills over into the float chamber.

Another path for liquid communication is a port 608 in the bottom wall of the float chamber. A floating check ball 60 is held beneath port 608 by fingers 610 surrounded by a protective wall 612. When the water level in the tank is above the bottom wall of the float chamber 600, the ball floats and blocks the port 608. When water is present in the float chamber 600 and when the water level in the surrounding tank drops below the bottom of the float chamber, the floating ball check 60 drops from the port 608 and water can flow from the float chamber.

The third path for liquid to flow between the float chamber and the surrounding tank is provided by a float controlled port 614 in the bottom wall of the float chamber 600. Port 614 is defined by a tubular wall 616 extending above and below the chamber wall.

Float 42 includes a hollow, open bottom body 42A and an integral support arm 42B for suspending the float from the outer end of lever 38 within the float chamber 600. The upper end of the arm 42B includes projections received in openings in the spring arms 38A. Air trapped within the body 42A causes the float 42 to be buoyant upon the surface of water when water is present within the float chamber 600. Within the body 42A is a tubular stopper 42C that is aligned with the tubular wall 616 defining the port 614. Unequal conical tapers are formed on the interfacing ends of stopper 42C and wall 616 to guide the stopper into contact with the wall 616 as the water level in the tank falls (FIG. 13). The stopper 42C cooperates with the tubular wall 616 to function as a valve closing the port 614 when the float 42 is in its lowermost position within the float chamber 600.

Operation of the fill valve assembly may be understood with reference to the partly schematic illustrations in FIGS. 19-22 of sequential positions of components of the assembly during a toilet tank flush and refill cycle. In the standby mode of FIG. 19, the water level is maintained in the tank at the elevation identified by the reference character T. The float 42 is in its uppermost position and stopper 42C is spaced above the tubular wall 616 with the result that the float controlled port 614 is open. As a result the water level within the float chamber 600 is at the level designated by the reference character F and this elevation is the same as elevation T. The check ball 60 is submerged and its buoyancy holds it against the port 608.

Because the float chamber 600 and tank interior freely communicate in the standby condition by way of the port 614, the float 42 reacts quickly to any change of the tank water level. This sensitivity permits the valve assembly to make up for any small leakage from the tank that can occur because of normal flush valve seepage or the like. When the water level is at the selected position determined by adjusting the height of the head portion 30 and thus the elevation of the weirs 606, the float 42 and lever 38 hold the pilot seat 56 closed upon the pilot orifice 404. Small amounts of leakage can be replaced by pilot flow of water past the restrictor pin 402 and through the pilot orifice 404 when the float drops slightly, without cycling the main valve disk 40 open and closed. In addition, this sensitivity provides fast response of the valve assembly to the decreasing water level at the beginning of a flush cycle.

In FIG. 20 the beginning of a flush cycle is shown. When a flush cycle occurs, the tank is emptied rapidly into the fixture, and the water level within the tank drops abruptly. As seen in FIG. 20, the water level T in the tank and the water level F in the float chamber 600 have dropped to a level approaching the top of the tubular wall 616. The descending float 42 pulls the control lever 38 down and pivots the pilot seat 56 away from the pilot orifice 404. Pressure drops within the control chamber 43 above the valve disk 40 and the valve moves to the open position. Water begins flowing through the valve assembly 24 for refilling the tank. The flow into the tank through the assembly 24 is slower than the flow from the tank required to flush the fixture and the water level continues to drop until the flush cycle ends.

Until the float controlled port 614 is closed by the descending float stopper 42C, the water level decreases simultaneously inside and outside of the float chamber. Then for a brief interval the tank water level drops while the float chamber water level does not change. However, as soon as the tank water level drops below the bottom wall of the float chamber 600, the floating check ball 60 drops away from the port 608. This permits the remaining water to flow out of the float chamber into the tank, leaving the float chamber empty.

The water level in the tank continues to fall until the flush cycle is complete and the flush valve closes. Then the flow through the valve assembly 24 to the outlet ports 36 begins refilling the tank. At the same time, flow diverted through the refill port 410 reseals the trap in the fixture. FIG. 21 illustrates the tank water level T below the float chamber as the tank is being refilled. The rising water level is below the float chamber. The ball check port 608 is open and the float controlled port 614 is closed.

As the water level in the tank rises to the elevation of the bottom wall of the float chamber, the check ball floats against the port 608 and closes the port. Port 614 continues to be closed by the float stopper 42C. The weight of the float 42 overcomes the buoyant effect of water in the port 614. As a result, water rises around the float chamber while the float chamber remains empty. This condition is illustrated in FIG. 22. Although the tank water elevation T is well above the bottom of the float chamber, the ports 608 and 614 are closed and water cannot enter the float chamber. Because the float 42 stays in its lowermost position, the main valve disk 40 remains in its fully open position as the water level approaches the selected elevation.

When the rising water level reaches the level of weirs 606 plus the added height of a meniscus that initially prevents flow over the weirs 606, water rushes over the weirs 606 and rapidly fills the float chamber to the selected level. The surface area of water in the tank surrounding the float chamber 600 is larger than the area of the float chamber. Thus the water in the tank acts as a reservoir of immediately available water to fill the float chamber quickly. This causes the float 42 to rise abruptly from the lowermost position of FIG. 22 to the uppermost position of FIG. 19. The main valve disk 40 accordingly moves quickly from the fully open to the fully closed position and problems associated with slow closure and flow throttling are avoided.

The level of water in the tank is precisely adjusted by telescoping movement of the conduits 202 and 302 relative to the support 100. The level is selected without removing or disassembling the assembly 24 by pushing the head portion down against inlet water pressure to release the latch structures 118 and 306, turning the head portion relative to the support 100 to free the teeth 116 from the flanges 304 and raising or lowering the head portion 30 as desired. The water level is established by the elevation of weirs 606. A visual reference may be provided on the exterior of the float chamber 600 to aid the user in setting the water level. Once set, the telescoping parts are latched with the aid of inlet water pressure, and the level is repeated precisely during subsequent refills.

While the invention has been described with reference to details of the embodiments of the invention illustrated in the drawings, these details are not intended to limit the scope of the invention as set forth in the appended claims.

I claim:

1. A height adjustable tank fill valve comprising:

a riser section having a bottom portion adapted to be secured to a wall of the tank and an upper portion;

an inlet port in said bottom portion of said riser section adapted to receive a pressurized liquid;

a head portion carried at said upper portion of said riser section;

valve means in said head portion for controlling flow of pressurized liquid from said inlet port into the tank;

said riser section including telescoped flow conduits axially slidable and rotatable relative to one another;

a latch flange on one of said telescoped flow conduits and cooperating latch teeth on the other of said telescoped flow conduits, said flange and a mating one of said teeth defining interfacing lock surfaces disposed generally perpendicular to the axes of said telescoped flow conduits, said lock surfaces being urged toward one another by the force of said pressurized liquid from said inlet port acting upon said head portion in any position of said valve means; and an axially extending detent projection on one of said lock surfaces and a mating detent recess on the other of said lock surfaces, said projection being maintained into said recess by the force of said pressurized liquid.

2. A riser assembly for a height adjustable fill valve of the type including a head assembly with a control valve for controlling flow of liquid under pressure from a tank inlet portion into the tank, said riser assembly comprising:

a pair of fixed conduit sections secured to the tank and extending generally parallel to one another;

a pair of structurally interconnected movable conduit sections each telescoped with one of said fixed conduit sections;

one of said fixed conduit sections and one of said movable conduit sections providing a path for flow of pressurized liquid from the tank inlet port to the head assembly upstream of the flow control valve;

the other of said fixed conduit sections and the other of said movable conduit sections providing a path for the flow of liquid from the head assembly downstream of the valve to the tank;

cooperating latch elements on one fixed conduit section and one movable conduit section, said latch elements including interfacing latch surfaces disposed generally perpendicular to the axes of said conduit sections, and detent means on said latch surfaces including at least one axially extending detent projection and at least one axially extending latch recess, said projection being maintained in said recess by the force of said pressurized liquid from said tank inlet portion acting upon said head assembly in any position of said control valve.

* * * * *